Patented Feb. 23, 1954

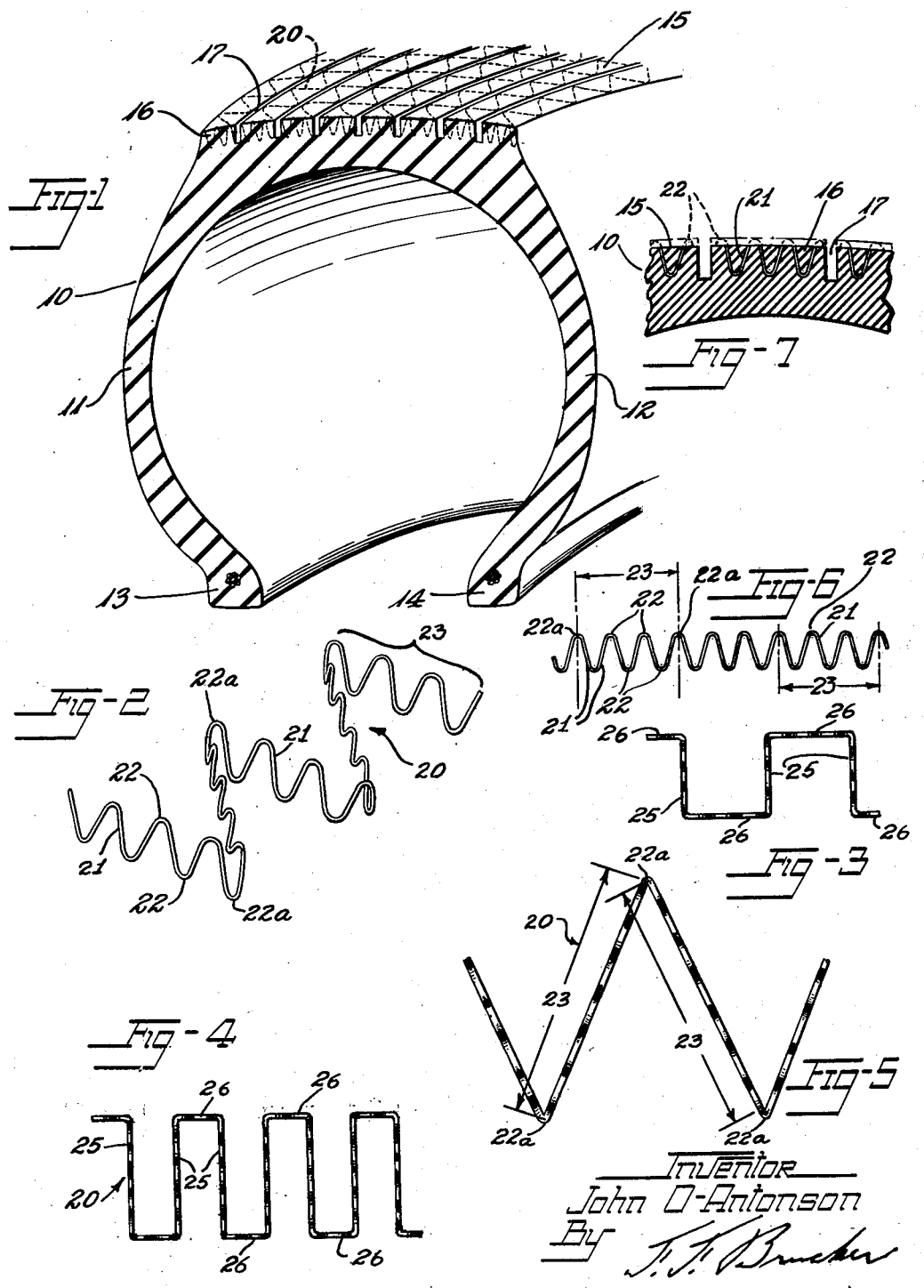

2,670,024

UNITED STATES PATENT OFFICE 2,670,024

TIRE FOR USE ON ICE

John O. Antonson, Akron, Ohio, assignor to The B. F. Goodrich Company, New York, N. Y., a corporation of New York Application July 22, 1948, Serial No. 40,175

10 Claims. (Cl. 152—211)

This invention relates to tires for use on ice and is especially useful where tires of the landing wheels of aircraft must contact icy runways in landing although the invention is also useful in the manufacture of tires for other vehicles for use on ice.

Heretofore it has been proposed to embed coiled spring wire in the rubber tread of a tire so that loops of wire were exposed at the tread and presented rows of exposed wire ends to ice or other slippery road surfaces upon slight wear of the tread, thereby providing by difference in deformability of the tread rubber and the wires, exposed claw ends of wire at the weight supporting road-contacting surface for obtaining a better grip upon the slippery surface. Such devices as have been proposed while somewhat successful in reducing slippage, have had the disadvantage that the exposed wire ends have been aligned in widely disposed circumferential rows about the tread of the tire leaving broad road contacting areas unprotected, and due to the shape of the coils which usually were of annular form, these were readily displaced from the tread.

In accordance with this invention a tire is provided having, after a period of initial wear, a greatly increased number of wire ends per unit area exposed at the tread face and distributed about the tread face more effectively than in the tires of this type heretofore proposed. The wire elements which wear with the tread face to provide these wire ends are embedded in the tread substantially the full depth of the tread, and these elements are shaped to preclude their displacement from the tread when the tire is in service. The wire elements are initially parts of a single traction member of novel shape which is embedded in the tread when the tire is built. This traction member may be formed of a single continuous wire which is bent sinuously to provide a series of leg portions alternately connected by loop portions, and then additionally bent back and forth in a zig-zag pattern in a single plane to form a row of separate lengths of wire, each length containing a plurality of the sinuosities formed by the leg and loop portions. The traction member is disposed circumferentially through a tread rib with these zig-zag lengths extending laterally of the tread rib and the sinuosities of each length extending transversely to the tread and generally radially relative to the tire. In a new tire, the loop portions disposed at or adjacent the ground-engaging tread face are severed by the initial wear of the tread to expose the ends of the leg portions. As the tread is worn further, the opposite ends of the leg portions (the ends directed away from the tread face) remain connected together by their respective loop portions, and since the loops and the legs do not form a surface of revolution, the leg portions are not easily displaceable from the tread.

These and other objects will appear from the following description and the accompanying drawings.

Of the drawings,

Fig. 1 is a perspective view of a section of a tire embodying the invention in one of its forms.

Fig. 2 is a perspective view of the wire traction member before it is embodied in the tire.

Fig. 3 is a plan view of another embodiment of the traction member.

Fig. 4 is a similar view of still another embodiment of the traction member.

Fig. 5 is a similar view of the embodiment of the traction member of Figs. 1 and 2.

Fig. 6 is a side view showing a partially completed traction member, the lines of subsequent bending of the member being indicated by dot and dash lines.

Fig. 7 is a cross-sectional view of the tire tread with the traction member of Fig. 4, showing in dotted lines the condition of the parts before wear of the tread and in full lines the condition after some wear due to use.

Referring to the drawing, the numeral 10 designates a tire casing of rubber or other resilient rubber-like material having the side wall portions 11, 12, bead portions 13, 14 which engage the wheel, and a tread portion 15. The tread portion is preferably formed of wide circumferential ribs 16 separated by narrow circumferential grooves 17 as such a tread provides lateral flexibility. The mold for forming such a tread would have relatively wide circumferential grooves complementary to the ribs 16 and separated by relatively narrow ribs complementary to the grooves 17 and defining partitions in the mold adapted to retain the wire traction members in position during molding of the tire. Such ribs and grooves in the mold are not necessary, however, as the mold might have locating pins therein for the same purpose where ribs and grooves in the tread were not desired.

Embedded in each tread rib 16 of the tire 10 is a traction member 20 which, before the tire tread is worn, is a continuous length of wire or other filamentary material the shape of which is best shown in Fig. 2. The wire is bent in sinuous form in a single plane to provide a plurality of leg portions 21 connected alternately by loop portions 22 as indicated in Fig. 6, and then additionally bent back and forth alternately in a zig-zag pattern in a single plane to form a row of lengths 23 arranged longitudinally of the traction element. The lengths 23 are represented in Fig. 6 by the portions of the sinuously-bent wire intermediate the chain-dotted lines and these lengths are alternately connected by loop portions 22a which extend generally lengthwise of the traction member at the sides of the member. Each of the lengths 23 contains a plurality of the initial sinuosities consisting of the leg portions 21 and their connecting loop portions 22. The lengths 23 extend laterally and each leg portion 21 extends transversely of the plane of the traction member.

Another way of describing the shape of the traction member 20 is to designate each pair of leg portions 21 and the loop portion 22 connecting them as a corrugation extending transversely to the plane of the member, and to designate each of the lengths 23 as corrugations extending laterally of the plane of the traction member. The lateral corrugations may be more specifically identified by designating every other length 23 as a "zig," and each intervening length 23 a "zag." Then the loops 22a are "first bends" which join the zigs and zags in series in a zig-zag pattern laterally of the plane of the traction member to space the zigs from the zags in a direction longitudinally of the member. Each zig and each zag includes a plurality of leg portions 21 which extend transversely to the plane of the member. The loop portions 22 connecting the leg portions 21 in each zig and zag are "second bends" in this terminology scheme, and these second bends space the leg portions from each other in a direction laterally of the member within each zig and each zag.

Instead of forming the traction member 20 with the lengths 23 bent in a sharp angled zig-zag path as in Figs. 1, 2 and 5, a sinuously-crimped wire such as shown in Fig. 6 may be shaped to form lateral parallel lengths 25 alternately bent at a right angle to longitudinal lengths 26. The lateral lengths 25 may be equal in length to the longitudinal lengths 26 as in Fig. 3, or the lateral lengths 25 may be longer than the lengths 26 as in Fig. 4 where the lateral lengths 25 each include three transverse corrugations of leg portions 21 and loop portions 22, whereas the longitudinal lengths 26 include only one transverse corrugation.

The width of the traction member 20 is substantially equal to the width of the ribs 16 so that each traction member extends circumferentially through its respective rib, filling the rib from side to side. The shape of the traction member makes it highly flexible so that the presence of the member in the tread does not appreciably impair the normal flexing characteristics of the tread. The traction member may be advantageously embedded in the ribs at the time the tire is cured by inserting the traction members into the complementary grooves in the vulcanizing mold which shape the ribs 16. Due to the flexibility of the traction member, it will conform easily to the curvature of the mold, and since the traction member is equal in width to the width of tread ribs, it may be snapped into the molding grooves for these ribs very conveniently. A new tire containing these traction elements will have a number of loops 22 at the ground-engaging surface of each tread rib which constitute the radially outermost portions of the traction member in the ribs.

In any of the embodiments of the invention the loops 22 at the tread surface rapidly wear through as indicated in Fig. 7 during use of the tires, each loop then providing a pair of spaced apart ends of wire at the tread face of the tire which due to their relative stiffness and hardness as compared to the rubber-like material of the tread, protrude slightly under pressure contact of the tread with ice or other supporting surface, providing a multitude of claw ends in high concentration broadly distributed over the tread surface for gripping ice or other supporting surface.

As the loops 22 which are embedded near the base of each tread rib are not annular, but are of U or V shape, the pair of leg portions 21 which they connect are not readily separated from the tire tread as their relative stiffness and angular shape prevents their separation by movement axially of the wire of which they are composed.

While the traction member has been defined as a filament and may be of metallic wire, either solid, braided, twisted or stranded, other sufficiently stiff and hard filamentary materials such as composite cords or monofils of plastic material or stranded, braided or twisted glass fibers embedded in plastic material may be employed. These will be understood to be included in the term filamentary material. The wire may be prepared for bonding to the rubber if desired as by coating it with adhesion promoting materials or by brass plating where the wire is of metal but this is not indispensable because the shape of the loops does not require them to be bonded to retain them in place.

In the manufacture of the traction member a wire filament may be first bent alternately back and forth at intervals in a single plane to provide a sinuous member as shown in Fig. 6 and subsequently bent out of that plane at intervals in opposite directions.

In the manufacture of the tire, the traction member may be placed in one of the grooves circumferential of the mold or may be located by pins in the mold and the unvulcanized tire may then be placed in the mold and forced outwardly into mold contact, embedding the traction member therein.

Variations may be made without departing from the scope of the invention as it is defined by the following claims.

I claim:

1. A traction element moldable in the tread rubber material of a vehicle tire comprising a length of wire bent in sinuous form thereby providing leg portions connected alternately by loop portions, said sinuous length of wire itself being additionally bent back and forth in substantially a single plane to form a row of lengths of wire each length having a plurality of sinuosities thereby providing an elongated flattened flexible strip readily conformable to the shape of a tire tread, said leg portions extending transversely of said plane of the flexible strip.

2. A traction element moldable in the tread rubber material of a vehicle tire comprising a length of wire bent in sinuous form thereby providing leg portions connected alternately by loop portions, said sinuous length of wire itself being additionally bent back and forth in substantially a single plane to form a row of individual lengths of sinuous wire, said lengths being connected at alternate ends by one of said loop portions thereby providing an elongated flattened flexible strip readily conformable to the shape of a tire tread, said leg portions extending transversely of said plane of the flexible strip.

3. A traction element moldable in the tread rubber material of a vehicle tire comprising a length of wire bent in sinuous form thereby providing leg portions connected alternately by loop portions, said sinuous length of wire itself being additionally bent back and forth in substantially a single plane in zigzag shape to form a row of lengths of wire each length having a plurality of sinuosities thereby providing an elongated flattened flexible strip readily conformable to the shape of a tire tread, said leg portions extending transversely of said plane of the flexible strip.

4. A tire having a tread portion of rubber material having raised ribs and grooves therebetween, a traction element molded in one of said ribs and filling the rib from side to side, said element comprising a length of wire bent in sinuous form thereby providing leg portions connected alternately by loop portions, said sinuous length of wire itself being additionally bent back and forth in substantially a single plane to form a row of lengths of wire each length having a plurality of sinuosities thereby providing an elongated flattened flexible strip readily conformable to the shape of a tire tread rib, said leg portions extending transversely of said plane of the flexible strip, the radially outermost portions of said element being disposed at the ground engaging face of said rib.

5. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig consisting of a series of portions each extending transversely of the plane of the strip and second bends integrally joining the ends of said portions in series and spacing the said portions apart from each other in a direction laterally of the plane of the strip.

6. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig and zag consisting of a series of portions each extending in a direction away from the plane of the strip, and second bends integrally joining the ends of said portions in series and spacing the said portions apart from each other in a direction laterally of the plane of the strip.

7. A corrugated zigzag wire structure comprising an elongated strip for embedment in a molded product, said structure having both laterally and transversely extending corrugations relative to the plane of the strip and comprising a plurality of zigs extending laterally to the plane of the strip, zags extending between said zigs and extending laterally to the plane of the strip, first bends integrally joining the said zigs and said zags in series in a zigzag fashion laterally of the plane of the strip and spacing the zigs from the zags in a direction longitudinally of the strip, each zig and zag consisting of a series of relatively straight portions each extending at an angle to the plane of the strip, and second bends integrally joining the ends of said relatively straight portions in series and spacing the relatively straight portions apart from each other in a direction laterally of the plane of the strip.

8. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig and zag consisting of a series of intermediate portions each extending transversely of the plane of the strip, and second bends integrally joining the ends of said intermediate portions in series and spacing the intermediate portions apart from each other in a direction laterally of the plane of the strip, the joined end portions of said zigs and zags constituting side portions of the strip and extending transversely of the plane of the strip.

9. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig and each zag consisting of a series of intermediate portions each extending transversely of the plane of the strip, and second bends integrally joining the ends of said intermediate portions in series and spacing the intermediate portions apart from each other in a direction laterally of the plane of the strip, the joined end portions of said zigs and zags constituting side portions of the strip and extending transversely of the plane of the strip, said side portions being substantially the same length as said intermediate portions.

10. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in a series in a zigzag fashion laterally of the plane of the strip and spacing the zigs from the zags in a direction longitudinally of the strip, each zig consisting of a series of portions each extending transversely of the plane of the strip, and second bends integrally joining the ends of said portions in series and spacing the said portions apart from each other in a direction laterally to the plane of the strip, said portions being spaced apart in a direction laterally to the plane of the strip at distances less than the distance between the closest planes passing through the successive second bends on opposite lateral sides of said structure.

JOHN O. ANTONSON.

References Cited in the file of this patent

UNITED STATES PATENTS

| Number | Name | Date |
|---|---|---|
| 345,767 | Buckley | July 20, 1886 |
| 936,123 | Grimm | Oct. 5, 1909 |
| 1,111,419 | Wadsworth | Sept. 22, 1914 |
| 1,159,244 | Midgley | Nov. 2, 1915 |
| 2,002,399 | Kaden | May 21, 1935 |
| 2,006,038 | Yamaki | June 25, 1935 |
| 2,153,936 | Owens | Apr. 11, 1939 |
| 2,256,158 | Weisbender | Sept. 16, 1941 |
| 2,450,876 | Blumensaadt | Oct. 12, 1948 |
| 2,458,238 | Bailey | Jan. 4, 1949 |
| 2,479,474 | Crooker | Aug. 16, 1949 |
| 2,614,599 | Sivon | Oct. 21, 1952 |

OTHER REFERENCES

Popular Mechanics, vol. 28, No. 3, September 1917, page 438.